United States Patent
Soudarev et al.

(10) Patent No.: US 6,214,284 B1
(45) Date of Patent: Apr. 10, 2001

(54) PROCESS FOR MANUFACTURING A SINTERED STRUCTURAL CERAMIC PART OF ALUMINUM NITRIDE

(75) Inventors: Anatoli Soudarev; Vladimir Grishaev, both of Saint Petersbourg (RU); Patrick Avran, Palaiseau (FR)

(73) Assignees: Onera, Chatillon; Electricite de France, Paris, both of (FR)

( * ) Notice: Subject to any disclaimer, the term of this patent is extended or adjusted under 35 U.S.C. 154(b) by 0 days.

(21) Appl. No.: 09/297,979

(22) PCT Filed: Nov. 13, 1997

(86) PCT No.: PCT/FR97/02042

§ 371 Date: May 12, 1999

§ 102(e) Date: May 12, 1999

(87) PCT Pub. No.: WO98/29354

PCT Pub. Date: Jul. 9, 1998

(30) Foreign Application Priority Data

Dec. 27, 1996 (FR) .................................................. 96 16135

(51) Int. Cl.⁷ .......................... C04B 35/582; C04B 35/65
(52) U.S. Cl. .......................... 264/642; 264/643; 264/647; 264/670; 264/655; 264/662; 264/678; 164/98; 419/6
(58) Field of Search .................................. 264/647, 662, 264/670, 678, 655, 642, 643; 164/98; 419/6

(56) References Cited

U.S. PATENT DOCUMENTS

| | | | |
|---|---|---|---|
| 3,833,389 | 9/1974 | Komeya et al. ........................ 106/55 |
| 4,460,528 | * 7/1984 | Petrak et al. .......................... 264/647 |
| 5,167,944 | * 12/1992 | Uda et al. ............................. 423/412 |
| 5,286,685 | * 2/1994 | Schoennahl et al. ................. 264/647 |
| 5,849,242 | * 12/1998 | Nikolaevna et al. ................. 264/647 |

FOREIGN PATENT DOCUMENTS 0 164 830 A2   12/1985   (EP) .
0 469 149 A1   2/1992    (EP) .

* cited by examiner

*Primary Examiner*—James Derrington
(74) *Attorney, Agent, or Firm*—Connolly, Bove, Lodge & Hutz, LLP.

(57) ABSTRACT

The invention concerns a process for manufacturing a part made of high temperature-resistant, ceramic material based on aluminum nitride and reaction sintering. The process comprises the steps of preparing a homogeneous mixture of boron nitride powder, aluminum powder and a paste-like binder, capable of solidifying by chemical reaction and by solvent loss through drying. The mixture is formed by mold casting and then pressed and heated, to a temperature not exceeding approximately 70° C., to harden the binder and to obtain a solid and manipulable unfired part. The binder is eliminated by heating to a temperature of approximately 300° C. Pores of the unfired part are impregnated by immersing the part in a bath of molten aluminum or aluminum alloy to form an impregnated preform. Thereafter, the impregnated preform is removed from the bath, cooled, and machined to the final dimensions of the part. A ceramic is obtained by reaction sintering the machined part at a temperature of 900 to 1000° C. Residual aluminum is removed from the pores of the ceramic part by heat treating it, at a temperature of 1100 to 1250° C., cooling it, and mechanically eliminating the aluminum that has collected on the surface of the part.

20 Claims, No Drawings

PROCESS FOR MANUFACTURING A SINTERED STRUCTURAL CERAMIC PART OF ALUMINUM NITRIDE

The invention concerns a process for manufacturing a part made of high-temperature resistant ceramic material, based on aluminum nitride AlN, by reaction-sintering.

Aluminum nitride is a ceramic material which has in this context a relatively low density (2.8 g/cm$^3$), and good strength at high temperatures (1800 K) in an oxidizing and corrosive atmosphere. This particular material also possesses other valuable properties such as good thermal conductivity (15 to 18 W/m.K) and a high thermal coefficient of expansion (9×10$^{-6}$/° C.) which enables it to be assembled to metals, in particular by the diffusion-brazing technique. All these properties make the use of aluminum nitride advantageous for various applications, in particular in the field of heat exchanges, motor vehicle parts, electrical insulators, electronic components and stopcock seals.

Known processes for producing a ceramic material from aluminum and boron nitride lead to products having at least some of the following defects:
- a heterogeneous structure with coarse grains and high porosity so that the properties cannot be reproduced;
- the absence of a monophase structure;
- service temperature limited to 600° C.;
- mechanical strength below 30 MPa.

The reaction-sintering technique, which consists of producing a ceramic part directly by chemical reaction between the reagents in the state of particles distributed in a homogeneous manner in the metal-ceramic composite of the preform, enables this part to be obtained at a temperature lower than that required for the sintering of pre-existing particles of ceramic material. However, the reaction-sintering process is usually accompanied by considerable shrinkage in volume which makes it necessary to machine the part to its final dimensions after conversion, using costly diamond tools which are the only ones capable of working ceramics. Moreover, reaction-sintering processes using aluminum as the reagent to provide an aluminum ceramic compound allows appreciable quantities of residual free aluminum to remain which harm the temperature resistance of the material.

The object of the invention is to overcome these disadvantages.

The process according to the invention comprises the following steps:
a) preparation of a homogeneous mixture of boron nitride BN, aluminum and a binder, in the liquid or paste-like state, able to solidify by chemical reaction and/or by solvent loss through drying, the boron nitride and aluminum being in the form of powders;
b) the forming of the said mixture by casting in a mould followed by pressing and heating to a temperature not exceeding approximately 70° C. to harden the binder and to obtain a solid and manipulable unfired part;
c) elimination of the binder by heating to a temperature of the order of 300° C.;
d) impregnation of the pores of the unfired part by immersion in a bath of aluminum or of an aluminum alloy in the molten state, removal of the impregnated preform from the said bath and cooling;
e) machining the preform of the Al—BN composite to the final dimensions of the part to be obtained;
f) reaction sintering at a temperature of between 900 and 1000° C. to form a ceramic based on aluminum nitride;
g) heat treatment to a temperature of between 1100 and 1250° C. to cause the residual aluminum to migrate out of the pores of the part, and mechanical elimination of the aluminum which has collected on the surface after any cooling.

One of the original features of the invention results from the succession of steps a) to c), and in particular impregnation with liquid aluminum or aluminum alloy of an unfired ceramic already containing aluminum, which leads to a blank consisting of a BN/aluminum alloy composite able to undergo reaction-sintering without appreciable shrinkage, and of which the coherence resulting from the absence of porosity enables it to be machined with the aid of conventional tools without diamond used for aluminum alloys, in particular those made of high quality high speed steel, to obtain a part of which the dimensions will be preserved after reaction-sintering (step e).

Step f) leads to the formation of a ceramic based on aluminum nitride AlN, and one or more aluminum borides such as AlB$_2$, AlB$_{10}$, AlB$_{12}$ and AlB$_{25}$. The increase in volume which accompanies these reactions compensates for the shrinkage due to sintering the ceramic material and enables parts to be obtained having a very low degree of porosity.

A porous network nevertheless remains which enables residual aluminum, melted during the heat treatment of step g), to flow towards the surface of the part, from whence it may be removed mechanically in a very simple manner, for example by brushing.

The ceramic parts prepared by the present invention also have the property of being capable of being assembled by diffusion-brazing. Assembly may be made either with two ceramic parts, or with two parts made of Al—BN, or with a ceramic part and a part made of an Al—BN composite. Assembly by brazing may be carried out using a braze having a suitable composition and by working at a temperature greater by 20° C. than the melting point of the braze, consisting of an Al—Si alloy. Assembly by diffusion-brazing is followed by a reaction-sintering treatment.

Complementary or alternative optional features of the invention are described below:
- in step a), 30 to 60 parts by weight of BN are mixed with 70 to 40 parts by weight of aluminum, and preferably approximately 40 parts by weight of BN with 60 parts by weight of aluminum.
- step a) is subdivided into
  a1) preparation of a first mixture formed of BN and aluminum powders and a first binder fraction;
  a2) compaction of the first mixture by pressing under a pressure of 30 to 140 bar into an ingot and heating to harden the binder;
  a3) elimination of the binder;
  a4) impregnation of the pores of the ingot with aluminum in the molten state, to obtain a composite ingot of Al—BN;
  a5) machining of the Al—EN composite ingot into turnings, mixing it with the EN powder and grinding it;
  a6) mixing of the resulting powder with a second binder fraction.
- The mass proportions of the constituents are close to 90% EN for 10% aluminum in step a1), 60% turnings of the first Al—BN composite for 40% EN powder in step a5) and 75% powders for 25% binder in steps a1) and a6).
- The binder is an aqueous solution of an organic polymer, preferably polyvinyl alcohol.
- The forming of step b) and/or the compacting of stage a2) are carried out under a pressure close to 45 bar.

The impregnation of step c) and/or of stage a3) is carried out by immersion in the impregnating bath, first of all under vacuum, preferably under a residual pressure of the order of 10 Pa, and then under a pressure of between 40 and 60 bar, preferably 50 bar.

The impregnation of step c) is carried out with an alloy of aluminum and silicon having a melting point lower than that of aluminum, preferably a eutectic alloy, brought to a temperature of between 740 and 850° C., preferably approximately 800° C.

Step f) is carried out in a neutral atmosphere, preferably under nitrogen.

The heat treatment of step g) is carried out in air at atmospheric pressure.

Two components are prepared separately by carrying out at least steps a) to e), these two components are assembled by diffusion-brazing and the assembly obtained is subjected, where appropriate, to the steps of the process which have been omitted for at least one of the components.

The two components are obtained following step e) and assembly by diffusion-brazing is followed by reaction-sintering carried out within the range of 950 to 1250° C., preferably at approximately 950° C. for approximately 1 hour and then at approximately 1250° C. for approximately two hours.

The two components are obtained following reaction-sintering at a temperature of between 950 and 1100° C., preferably at approximately 1000° C., and assembly by diffusion-brazing is followed by post-sintering carried out at between 1000 and 1250° C., preferably at approximately 1100° C.

The subject of the invention is also a part produced by reaction-sintering such as can be obtained by the process as defined above, formed essentially of aluminum nitride and being practically free from free aluminum and open porosity.

The part according to the invention advantageously contains trichites of silicon nitride.

The use of an alloy of aluminum and silicon, and in particular an eutectic alloy enables the impregnation temperature of the unfired part to be reduced. Moreover, the presence of silicon in the ceramic material obtained leads to the formation of trichites of silicon nitride $Si_3N_4$, improving the mechanical properties of the ceramic obtained by reaction-sintering.

During the final heat treatment in air, it is possible for oxidized compounds of boron and/or aluminum and/or possibly silicon to form on the surface, which block the surface pores, making the part impermeable and very resistant to corrosion. The impermeability may also be improved by a known coating of the silica gel type applied at a temperature of between 850 and 1200° C.

Carrying out step g) in several successive cycles makes it possible to use a conventional furnace for this purpose. It may be carried out in a single step if means are used enabling the liquid aluminum to be removed as it appears on the surface of the part, for example by centrifuging.

The characteristics and advantages of the invention will be given in greater details in the following description of a few examples of embodiments, with reference to the accompanying drawing in which the single figure represents a time-temperature curve in the process according to the invention.

In the examples, all the proportions are given by weight.

EXAMPLE 1

Using a ball mill, 10 parts by weight of aluminum powder and 90 parts by weight of BN powder were mixed for 20 hours. 75 parts by weight of the powdered mixture, having a particle size of between 3 and 10 $\mu$m, were wetted with 25 parts by weight of an aqueous solution of polyvinyl alcohol in the following proportions: water 80%, polyvinyl alcohol 20%. The slip obtained in this way was then filtered through a metal sieve having a mesh size of 0.5 mm×0.5 mm in order to remove any aggregates. After casting the slip into an ingot mould, compaction was carried out under a pressure of 45 bar to form an ingot which was dried at a temperature of less than or equal to 70° C. for at least 20 hours, so as to remove water almost completely. After removing the binder by heat treatment at 300° C., the ingot was immersed in a bath of molten aluminum under a pressure of approximately 11 Pa (0.08 Torr) for a period of between 1 hour and 1.5 hours. The molten aluminum bath together with the ingot were then transferred, over a period of no more than 1 minute, to an autoclave where they were subjected to a pressure of 50 bar for one minute. The ingot thus impregnated was withdrawn from the liquid aluminum bath to solidify.

The curve in the figure represents changes to the temperature of the ingot with time from the end of drying to its removal from the aluminum bath.

The ingot made of Al—BN alloy thus obtained was reduced into turnings having a thickness less than 2 mm by machining (turning). A mixture consisting of 60% turnings and 40% BN powder was then ground in order to obtain a homogeneous powder with a particle size of 2 to 5 $\mu$m. A slip was then prepared consisting of 75% powders and 25% of a polyvinyl alcohol solution (water 80%, polyvinyl alcohol 20%).

The casting operations were repeated, this time into a mould having the shape of the parts to be obtained, as well as the pressing, drying and impregnating operations described above, while replacing the aluminum bath with an aluminum-silicon eutectic alloy containing 12% silicon. The impregnation temperature was increased to 850° C. to facilitate penetration of the molten alloy into the pores which had a smaller diameter than previously. With this exception, the curve in the figure remains valid.

A blank was obtained in this way made of a coherent composite alloy of aluminum-BN particles which could be machined to the final dimensions by means of conventional tools without diamond.

After machining the parts to the final dimensions, the reaction-sintering reaction was carried out by bringing the part to a temperature of 1000° C. for 2 hours under an atmosphere of nitrogen. The operation to remove residual aluminum could have included up to three successive heat treatments of two to fifteen minutes in air and at atmospheric pressure, in a furnace raised to a temperature of between 1100 and 1250° C., the part being cooled and brushed after each treatment to remove droplets of aluminum which had collected on the surface.

The chemical composition of the part, obtained from analysis of the phases formed by X ray diffraction, was as follows:

| | |
|---|---|
| AlN | 90% |
| $AlB_x$ (x = 2, 10, 12, 15) | 4–6% |
| $Si_3N_4$ | 2–3% |
| Al—Si | 2% |

The physical, thermal and mechanical properties at ambient temperature (20° C.) were as follows:

density: 2.8 to 2.9 g/cm$^3$;

porosity: 4 to 8%;

3-point bending strength: 150 to 180 MPa (80 MPa at 1200° C.)

compressive strength: 450 to 550 MPa;

modulus of elasticity: 120 MPa;

tenacity: 14 MPa√m thermal conductivity: 15–18 W/m.K;

coefficient of thermal expansion: 9.10$^{-6}$° C.$^{-1}$;

maximum working temperature: 1600 to 1650° C.;

hardness: 200 HB

EXAMPLE 2

This example illustrates the assembly by diffusion-brazing of two parts obtained by implementing the process according to the invention as far as step e) only. The parts to be assembled were made of an Al—BN composite material and the surfaces to be assembled could be prepared mechanically by means of a conventional abrasive sheet.

A braze was used containing silicon, preferably an Al—Si alloy such as ASA12 or AS13, having a melting point lower than that of the Al—BN composite. The braze was brought to a temperature above its melting point, advantageously approximately 950° C., and brush-applied to the parts to be assembled which were then pressed against each other for 30 to 60 s.

In order to obtain the final ceramic material, the assembly was then subjected to reaction-sintering at 950° C. for 1 h and then at 1250° C. for 2 h.

EXAMPLE 3

This example illustrates the assembly by diffusion-brazing of two ceramic parts obtained by the process according to the invention. The diffusion-brazing process was facilitated if the parts to be assembled still contained a certain quantity of aluminum. It was thus preferably to omit at least part of step g) of the process.

In the example, the two parts were obtained following reaction-sintering at 1000° C. The same braze was used as in example 2, applied in the same manner, the surfaces to be assembled being prepared with the aid of a diamond-coated cloth.

The assembly was subjected to post-sintering at 1100° C.

It is also possible according to the invention to assemble by diffusion-brazing a part made of AlN ceramic material and a part made of Al—BN composite material.

What is claimed is:

1. A process for manufacturing a part based on aluminum nitride comprising the following steps:
    a) preparing a homogeneous mixture of boron nitride, aluminum and a binder, wherein the binder is in a liquid or paste-like state and capable of solidifying by chemical reaction and/or by solvent loss through drying and wherein the boron nitride and aluminum are in the form of powders;
    b) forming the mixture by casting in a mold followed by pressing and heating to a temperature not exceeding approximately 70° C. to harden the binder and to obtain a solid and manipulable unfired part;
    c) eliminating the binder by heating to a temperature of approximately 300° C.;
    d) impregnating pores of the unfired part by immersion in a bath of aluminum or aluminum alloy in the molten state to form an impregnated preform, removing the impregnated preform from the bath and cooling;
    e) machining the impregnated preform to form a part having final dimensions;
    f) reaction sintering the part at a temperature of 900 to 1000° C. to form a ceramic part based on aluminum nitride; and
    g) heat treating the ceramic part at a temperature of 1100 to 1250° C. to cause residual aluminum to migrate out of pores of the part and after cooling, mechanically eliminating aluminum which has collected on the surface of the part.

2. The process as claimed in claim 1, wherein in step a), 30 to 60 parts by weight of boron nitride is mixed with 70 to 40 parts by weight of aluminum.

3. The process as claimed in claim 1, wherein step a) is subdivided into
    a1) preparing a first mixture formed of boron nitride and aluminum powders and a first binder fraction;
    a2) compacting the first mixture by pressing under a pressure of 30 to 140 bar into an ingot and heating to harden the binder;
    a3) eliminating the binder;
    a4) impregnating the pores of the ingot with molten aluminum to obtain a composite ingot of Al—BN;
    a5) machining the Al—BN composite ingot into turnings, mixing the turnings with boron nitride powder and grinding the turnings;
    a6) mixing the resulting powder obtained from step a5) with a second binder fraction.

4. The process as claimed in claim 3, wherein the mass proportions of the mixture constituents are close to 90% boron nitride and 10% aluminum in step a1), 60% turnings of the first Al—BN composite and 40% boron nitride powder in step a5), 75% boron nitride and aluminum powders and 25% binder in step a1), and 75% resulting powder and 25% binder in step a6).

5. The process as claimed in claim 1, wherein the binder is an aqueous solution of an organic polymer.

6. The process as claimed in claim 3, wherein: the mixture formation of step b) and/or the mixture compaction of step a2) are carried out under a pressure close to 45 bar.

7. The process as claimed in claim 3, wherein: the pore impregnation of step d) and/or of step a4) is performed initially under a vacuum, residual pressure of about 10 Pa, and then under a pressure of 40 to 60 bar.

8. The process as claimed in claim 1, wherein: the pore impregnation of step d) is carried out with an alloy of aluminum and silicon, having a melting point lower than that of aluminum, that is brought to a temperature of 740 to 850° C.

9. The process as claimed in claim 1, wherein: the reaction sintering of step f) is carried out in a neutral atmosphere.

10. The process as claimed in claim 1, wherein: the heat treatment of step g) is carried out in a air at atmospheric pressure.

11. The process as claimed in claim 1 wherein: two component parts are prepared separately by carrying out at least steps a) to e), these two component parts are assembled by diffusion-brazing and the assembly is subjected to any of the steps (f) and (g) of the process which have been omitted for at least one of the component parts.

12. The process as claimed in claim 11, wherein: following step e), reaction sintering is carried out on the assembly within the range of 950 to 1250° C., for approximately 1 hours and then at approximately 1250° C., for approximately two hours.

13. The process as claimed in claim 11, wherein: reaction-sintering at a temperature of 950 to 1100° C. is carried out on the component parts prior to their assembly through diffusion brazing and, following the assembly by diffusion brazing, post-sintering is carried out at 1000 to 1250° C.

14. The process as claimed in claim 1, wherein: in step a), approximately 40 parts by weight of boron nitride is mixed with 60 parts by weight of aluminum.

15. The process as claimed in claim 1, wherein: the binder is an aqueous solution of an organic polymer of polyvinyl alcohol.

16. The process as claimed in claim 3, wherein: the pore impregnation of step d) and/or of step a4) is performed initially under a vacuum, residual pressure of about 10 Pa, and then under a pressure of approximately 50 bar.

17. The process as claimed in claim 1, wherein: the pore impregnation of step d) is carried out with an eutectic alloy of aluminum and silicon, having a melting point lower than that of aluminum that is brought to a temperature of approximately 800° C.

18. The process as claimed in claim 1, wherein: the reaction sintering step f) is carried out in a neutral atmosphere of nitrogen.

19. The process as claimed in claim 11, wherein: following step e), reaction sintering is carried out on the assembly at approximately 950° C., for approximately 1 hour, and then at approximately 1250° C., for approximately two hours.

20. The process as claimed in claim 11, wherein: reaction-sintering, at a temperature of approximately 1000° C., is carried out on the component parts prior to their assembly through diffusion brazing and, following the assembly by diffusion brazing, post-sintering is carried out at approximately 1100° C.

* * * * *